W. H. HERMANN.
TIRE BUILDING MACHINE (STATIONARY).
APPLICATION FILED DEC. 26, 1918.

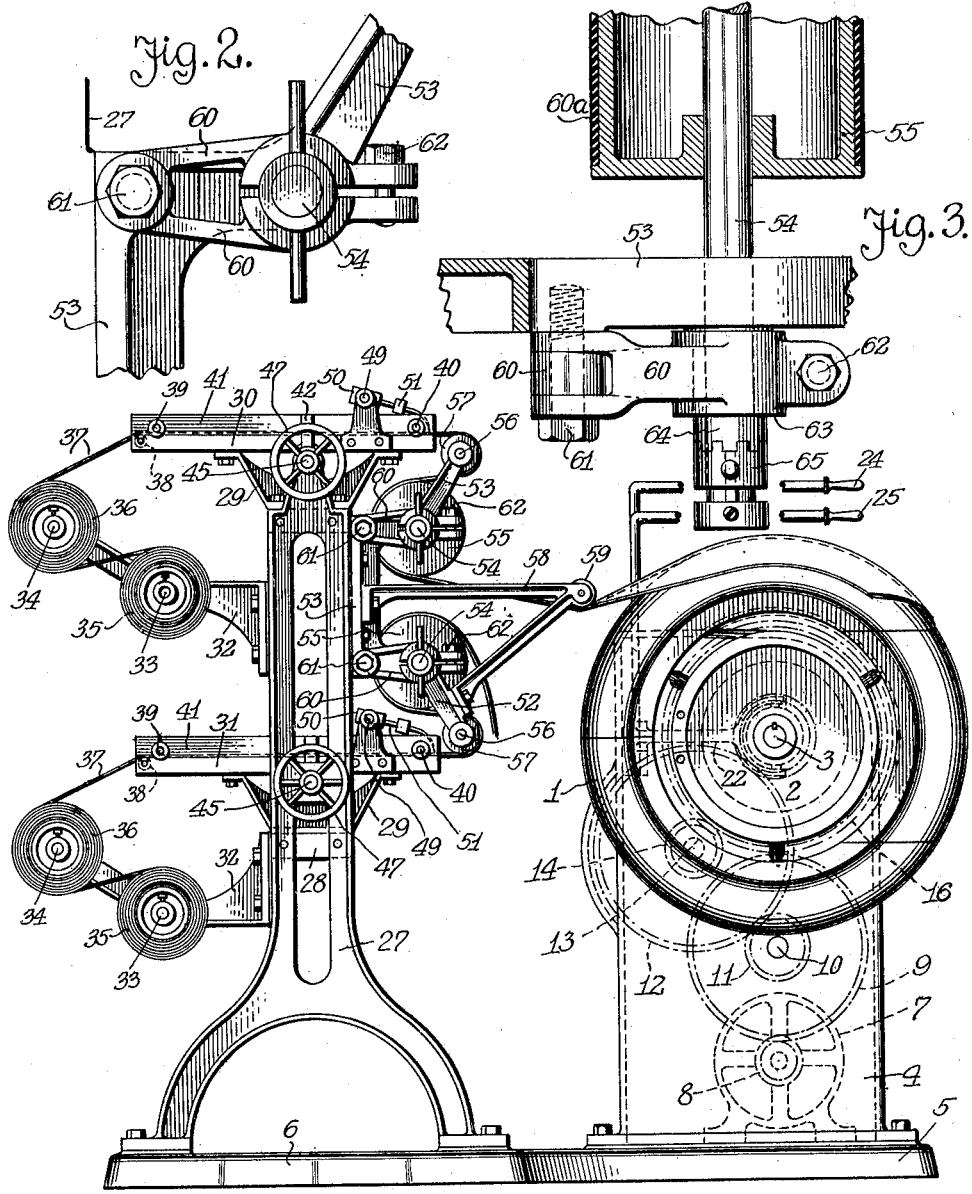

1,399,118.

Patented Dec. 6, 1921.
3 SHEETS—SHEET 2.

Witness
Chas. W. Stauffiger
Karl H. Butler

Inventor
Walter H. Hermann,
By
Attorneys

W. H. HERMANN.
TIRE BUILDING MACHINE (STATIONARY).
APPLICATION FILED DEC. 26, 1918.

1,399,118.

Patented Dec. 6, 1921.

Inventor
Walter H. Hermann,

UNITED STATES PATENT OFFICE.

WALTER H. HERMANN, OF LANCASTER, OHIO, ASSIGNOR TO THE HERMAN TIRE BUILDING MACHINE COMPANY, OF COLUMBUS, OHIO, A CORPORATION OF OHIO.

TIRE-BUILDING MACHINE, (STATIONARY.)

1,399,118.   Specification of Letters Patent.   Patented Dec. 6, 1921.

Application filed December 26, 1918. Serial No. 268,402.

*To all whom it may concern:*

Be it known that I, WALTER H. HERMANN, a citizen of the United States of America, residing at Lancaster, in the county of Fairfield and State of Ohio, have invented certain new and useful Improvements in Tire-Building Machines, (Stationary,) of which the following is a specification, reference being had therein to the accompanying drawings.

In the manufacture of tires, either of the solid or pneumatic type, it is the present practice to build up or fabricate a tire body or base from a plurality of strips of material to form a laminated structure which eventually becomes a homogeneous mass and as such serves as a body or base for a tread or outer finishing structure. In a pneumatic tire an outer casing is formed, or a laminated structure that may form part of such tire or part of a solid tire, in either instance it being desirable to produce a body possessing to the highest degree attainable, a maximum strength, integrity, resiliency and endurance, together with maximum resistance against perforation. To this end, strips of fabric or fibrous material, previously treated, are laid, piled, built on or applied to each other until there is, when completed or vulcanized, one homogeneous integral body capable of withstanding the wear, tear, and strain imposed upon penumatic tires in the ordinary use thereof upon motor and other vehicles.

To expeditiously and economically construct such a tire body, the strips of material have been made of considerable length and wound on rolls or spools disposed so as pieces of desired length, width or texture could be conveniently withdrawn and applied to a core or form and to each other. For this purpose machines have been designed and as an instance, of such a machine that has been in use may be cited the disclosure of my Patent No. 1,159,840 granted Nov. 9, 1915. This patent shows a tire building machine of the horizontal rotary type having a multiple stock holder, tensioning rolls, etc., and about the only objection to this machine is the size and cost of manufacture.

The main object of this invention is to provide a tire building machine embodying the good features of my prior machine, above referred to, plus certain structural features which contribute toward a machine possessing all that may be desired as to compactness, cheapness of manufacture, convenience of operation and accessibility of parts.

With the above and other objects in view, which will more readily appear when the nature of the invention is better understood, the same consists in the novel construction, to be hereinafter more fully described and then claimed.

The essential features of the invention, involved in carrying out the main objects above indicated, are necessarily susceptible to a wide range in structural modification without departing from the spirit or sacrificing any of the advantages of the invention, but a practical embodiment thereof is suggested in the drawings, in which—

Figure 1 is a side elevation of the tire building machine;

Fig. 2 is an enlarged detail elevation of a tension device, forming part of the machine;

Fig. 3 is a plan of the tension device, showing parts of the machine in section;

Figure 5:
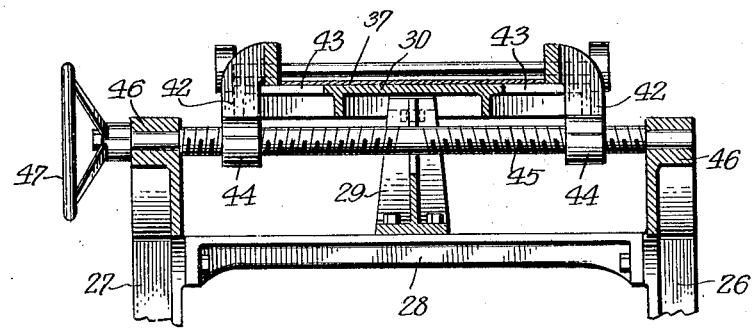
Fig. 5 is an enlarged cross-sectional view of a portion of the machine, taken on the line V—V of Fig. 4.

It is essential in the production of tire bodies or outer casings in accordance with my invention to use some type of core or form on which the tire body or casing may be fabricated, and as illustrating a conventional form of core, preferably of the collapsible or knock-down type, there is shown a core 1 held by a chuck or holding member 2 on the end of a two-speed shaft 3. This shaft is journaled in the upper portion of a housing 4 mounted on the side extension 5 of a base or bed plate 6.

To impart movement to the shaft 3, preferably at two speeds, an electric motor 7 is arranged in the lower portion of the housing 4, said electric motor representing a suitable source of power that may be within the housing 4 or exteriorly thereof. The armature shaft of the motor 7 has a small gear wheel 8 meshing with a large gear wheel 9 on another shaft 10 journaled in the housing 4, said shaft having a small gear wheel 11 meshing with a large gear wheel 12 mounted on another shaft 13 journaled in the housing 4. The shaft 13 has small and large gear wheels 14 and 15 meshing with large and small gear wheels 16 and 17 respectively, carried by clutch members 18 and 19 loose on the shaft 3. The clutch members 18 and 19 are independent of each other and adapted to engage said clutch members are shoes or conical members 20 and 21 slidably keyed on the shaft 3 and adapted to rotate therewith. The shoes or conical members 20 and 21 are shifted through the medium of arms 22, a link 23 and levers 24 and 25, the lever 24 controlling the operation of the member 21 and the lever 25 the operation of the member 20. These levers extend over the top of the housing 4 convenient to the operator or attendant of the machine, and the clutch members 18, 19, 20 and 21 constitute a conventional form of clutch by which a driving relation may be established between the shaft 3 and the driven shaft 13. The train of gear wheels associated with the shaft and clutch members constitute a change speed mechanism, when associated with the clutches, so that it is possible to operate the core 1 at one of two desired speeds. With the core in a vertical plane and at a height convenient to the operator or attendant of the machine, it is possible for strips of material, such as skin-coated or rubber saturated canvas, to be quickly applied to the core during its rotation by the mechanism within the housing 4.

On the base or bed plate 6 are opposed parallel uprights 26 and 27 connected by cross members or beams 28 supporting the pedestals or legs 29 of superposed platens or guide tables 30 and 31.

Attached to what may be considered the rear edge of the upright 28 are brackets or supports 32, each being adjacent one of the guide tables and each being provided with spindles 33 and 34, the spindles 33 supporting rolls of stock 35 and the spindles 34 supporting rewind or take-up rolls 36. Since the stock or material is of an adhesive or gummy nature, strips of non-adhesive material are sandwiched between the convolutions of the adhesive material, and these non-adhesive strips are wound on the rolls 36 as the adhesive material is unwound from the rolls 35.

The useful or adhesive strips of stock material are designated 37, and the free ends thereof are carried upwardly over anti-frictional rollers 38, at the rear ends of the guide tables or platens 30 and 31, and under rods 39 and 40 at the ends of the guide tables. The rods 39 and 40 are loosely supported by side guide plates 41 movable to and from each other on each guide table or plate. The side plates 41 are carried by brackets 42 intermediate the ends thereof, and said brackets are slidable in slots 43 of each guide table and supported from nuts 44 adjustable on a screw 45 rotatable in bearings 46 at the upper ends of the uprights 26 and 27. The screws 45 have right and left hand screw threads so that by rotation of said screws the nuts 44 may be shifted to and from each other and thus adjust the side plates 41 on each guide table. To facilitate adjusting the screws 45, said screws have hand wheels 47 on the ends thereof preferably at the same side as the upright 27.

It is through the medium of the adjustable side plates 41 that the strips of material 37 may be properly centered on the guide table and to indicate a center line on said material, each table is provided with supports 48 for a transverse rod 49. Adjustable on each rod is a holder 50 for a marking device 51, said marking device extending over the rod 40 to engage the strip of material and mark thereon a center line.

Suitably connected to the front edges of the uprights 26 and 27 are frames 52 and 53 respectively, and these frames afford bearings for the pintles or shafts 54 of large rollers 55 and the pintles or shafts 56 of small rollers 57. The small rollers 57 are in a plane with the guide tables 30 and 31 and it is over these small rollers that the strips of material 37 are trained, also to extend over the large rollers 55, thus bringing the ends of the strips of material in proximity to each other.

Connected to the frames 52 and 53 are brackets 58 supporting a roller 59, and it is under this roller that a strip of material extends to be applied to the core 1, as shown in Fig. 1.

The large rollers 55 are adapted to frictionally engage the strips of material and for this purpose the large rollers have rubber or yieldable peripheral covers 60$^a$, as best shown in Fig. 3, and to exert a tension on the strips of material and maintain the same taut a tension device is associated with the spindle or shaft 54 of each large roller 55, at the frame 53.

Figure 4:
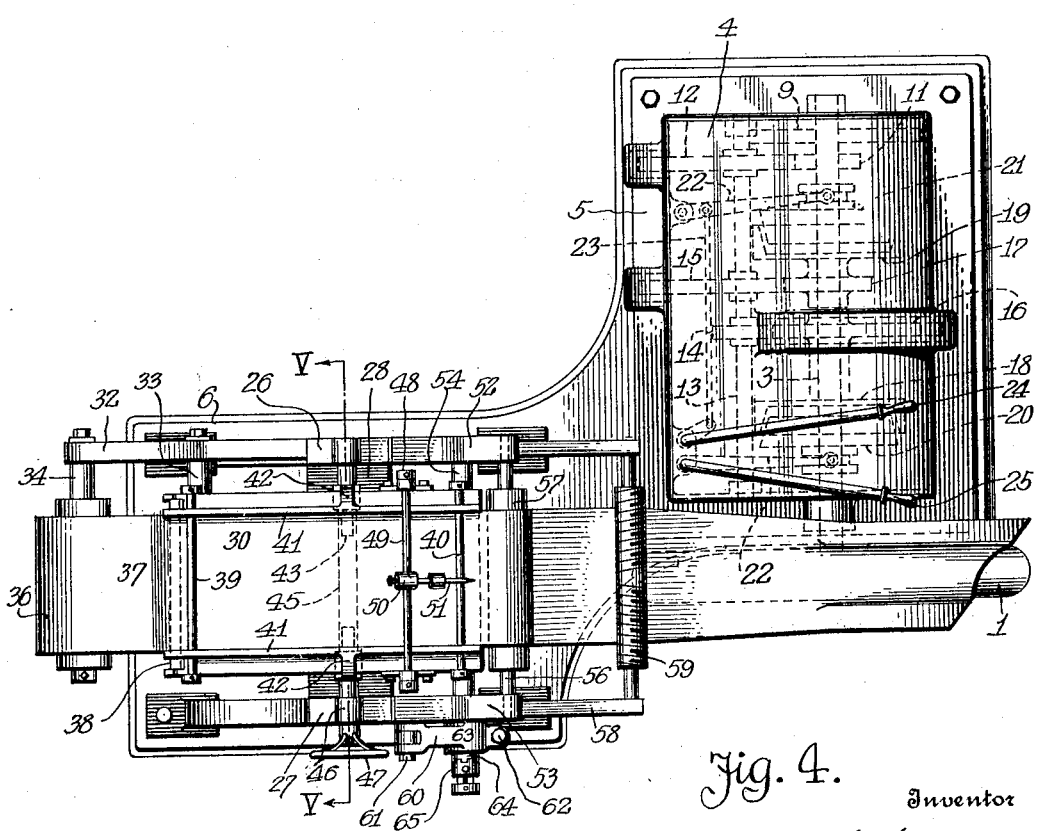
Fig. 4 is a plan of the complete machine.

Each tension device comprises clamp or brake members 60 pivotally connected to the frame 53, as at 61. The members 60 are connected by a screw 62 or similar adjustable means for bringing the hub portions 63 of the members 60 into frictional engagement with a hub or sleeve 64 loose on each roller shaft 54. The hubs or sleeves 64 have the outer ends thereof notched, toothed or otherwise constructed to interlock with clutch members 65 slidably keyed on the outer ends of the shafts 54 and adapted to be shifted into and out of engagement with the hubs or sleeves 64. When the clutch members 65 are shifted out of engagement with the hubs or sleeves 64, then the roller shafts or spindles 54 may be revolved in the hubs or sleeves. When the hub members are in engagement with the hubs or sleeves a connection is established between the shafts 54 and the hubs or sleeves 64 causing the hubs or sleeves to revolve in the hub portions 63 of the tension device. It is therefore possible to adjust the screws 62 so that the desired degree of friction will exist between the hub 64 and the hub portion 63, thus making the large rollers 55 easy or hard to rotate, according to the degree of tension desired between the large rollers and the core 1. Again referring to the rollers 59, it will be noted by reference to Fig. 4 of the drawing, that these rollers have right and left screw threads and it is this threaded surface of the rollers that tends to laterally stretch the pieces of material and thus maintain the material at its full width for application to the core 1. These stretching rolls combined with the large friction rolls positively maintain the strips taut and in perfect condition for mounting on the core 1.

As brought out at the beginning, the stock or material may be of various widths, texture and thickness, according to the tire to be built up, and the machine herein referred to has been designed for simply holding two grades of stock or material. As shown in Fig. 1, one grade of material is being applied to the core 1, while the other grade remains inactive, but always accessible to the operator or attendant of the machine.

Assuming that the operating mechanism of the core 1 has been set at a desired speed, the operator pulls forth the desired grade of material to be built up on the core 1. Prior to doing this, however, the strip of material is centered on the guide table and the marking device properly set, so that as the strip passes from the machine, the operator may observe the center line of the strip and see that it is accurately or evenly applied to the core.

In practice, the fabrication of the tire body may be performed in two ways, that is, the tire body may be built up of individual strips, one on the other with lapped and staggeredly arranged joints, or a strip of material may be wound to provide a series of convolutions with a total thickness approximating that of the body desired for a tire. In the first instance, the operator will sever the strip 37 after a piece thereof is applied to the core 1 and it will overlap the ends of the strip. Then, at another point from the overlapped joint, another strip will be started on the core and so on until a laminated body is formed of desired size.

During the operation of applying the strips to the core on a built up tire body, the operator uses sufficient care to have the strips properly centered on the core or on each other and uses well known instruments for inturning and smoothing out the edges of the strips, so that eventually the core is covered by laminated strips that adhere to each other and eventually form a homogeneous mass. When the strips are properly applied and the edges thereof turned in, little if any, trimming is necessary, although the operator of the machine is equipped to trim the material during its applicaton or after the core body has been built up.

Figure 6:
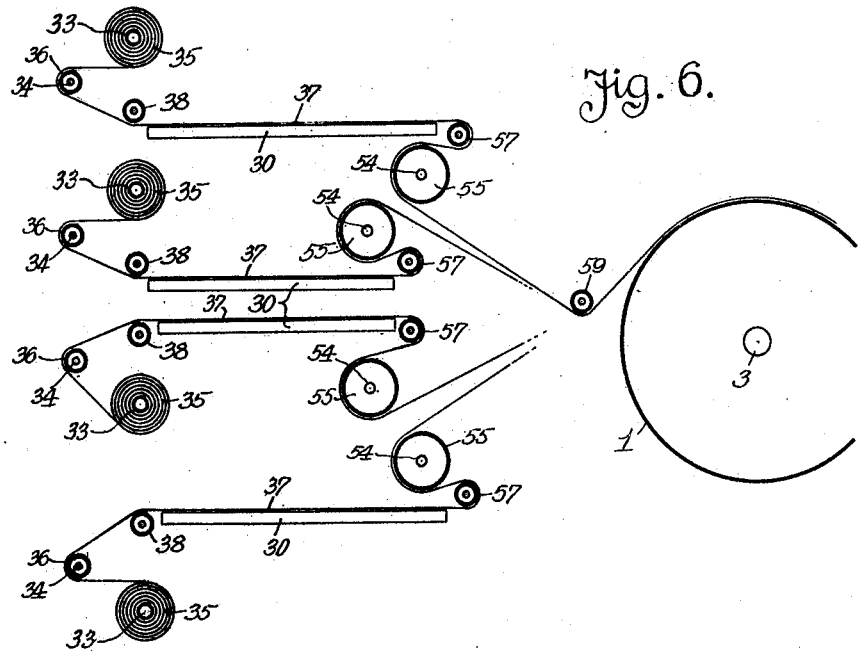
Fig. 6 is a diagrammatic view of a four unit machine, showing a modified arrangement of stock rolls
Figure 7:
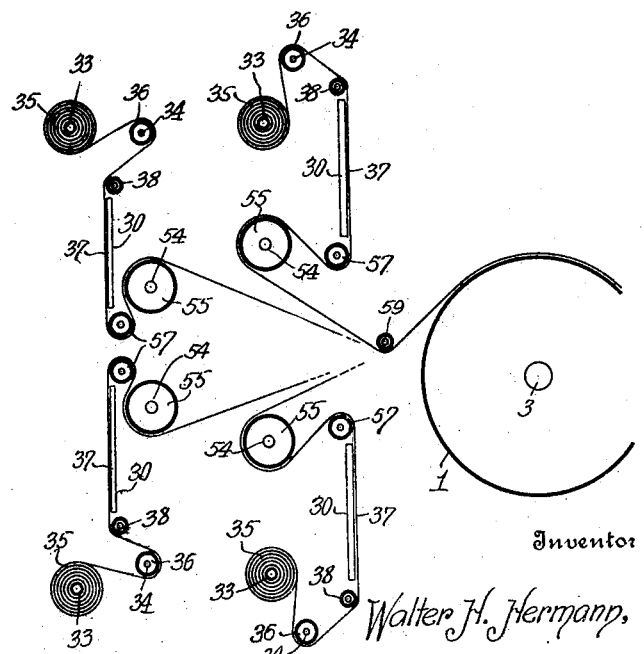
Fig. 7 is a similar view of a four unit machine illustrating a further arrangement of stock rolls.

A machine of greater capacity and embodying the same principles can be constructed as diagrammatically shown in Fig. 6 or Fig. 7, the former showing a four unit machine from which four strips of material can be withdrawn, individually or collectively, and the same is true of the machine suggested, by Fig. 7, said machine differing from the machine suggested in Fig. 6 by having its guiding tables or platens in a vertical position with superposed rolls and rollers. A minimum floor space is a desideratum in connection with such machines, and with this end in view, my companion applications disclose more compact machines of greater capacity.

What I claim is:—

1. A tire building machine comprising stationary uprights, superposed guide tables carried thereby, superposed stock supporting means at the rear ends of said tables and over which the stock extends in lateral parallel planes, and a tension roller supported by said uprights adjacent the front ends of said tables and maintaining the stock taut.

2. A tire building machine comprising uprights, stock rolls supported at the rear of said machine and adapted to have the stock thereof passed to the front of said machine and into a horizontal plane intermediate the stock rolls, tension rollers for the stock from said rolls, and above and below such horizontal plane and a stretching roller in the said horizontal plane for the stock after engaging either of the tension rollers.

3. In a tire building machine, the combination of a stock roll, a tension roller for the stock, means adapted for regulating the tension of said tension roller, said means including clamping members and a hub adapted to frictionally engage said members and govern the rotation of said tension rollers, and means associated with said hub for releasing said tension rollers relative to said hub.

4. In a tire building machine, the combination of a stock roll, a tension roller for the stock, and means adapted for regulating the tension of said tension roller, said means including a roller shaft, a hub loose thereon, clamping members engaging said hub to retard movement thereof, and a clutch on said roller shaft for engagement and disengagement with said hub so as to control rotative relation between said hub and roller shaft.

In testimony whereof I affix my signature in the presence of two witnesses,

WALTER H. HERMANN.

Witnesses:
ANNA M. DORR,
KARL H. BUTLER.